Nov. 1, 1966   R. G. WASON   3,282,617
LOCKING MEANS FOR GATES
Filed July 28, 1964   3 Sheets-Sheet 1

INVENTOR
ROBERT G. WASON
BY *Erwin A. Yaeger*
ATTORNEY

INVENTOR
ROBERT G. WASON

BY Erwin A. Yaeger

ATTORNEY

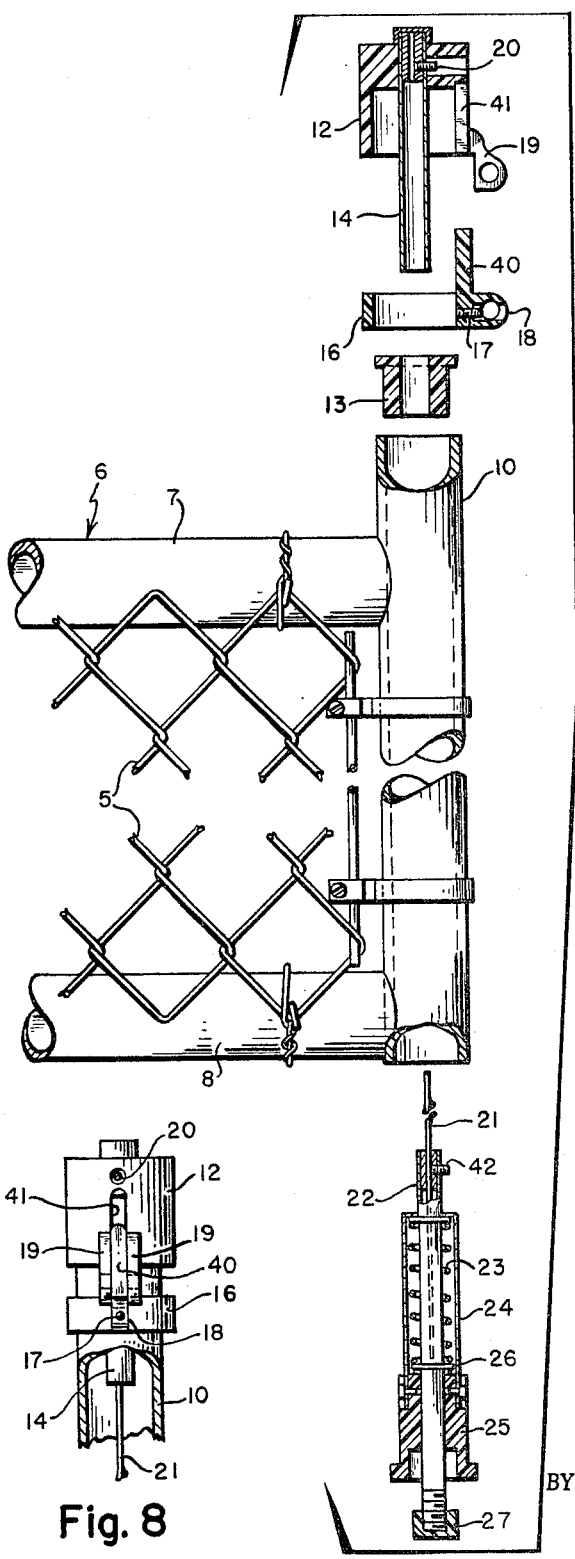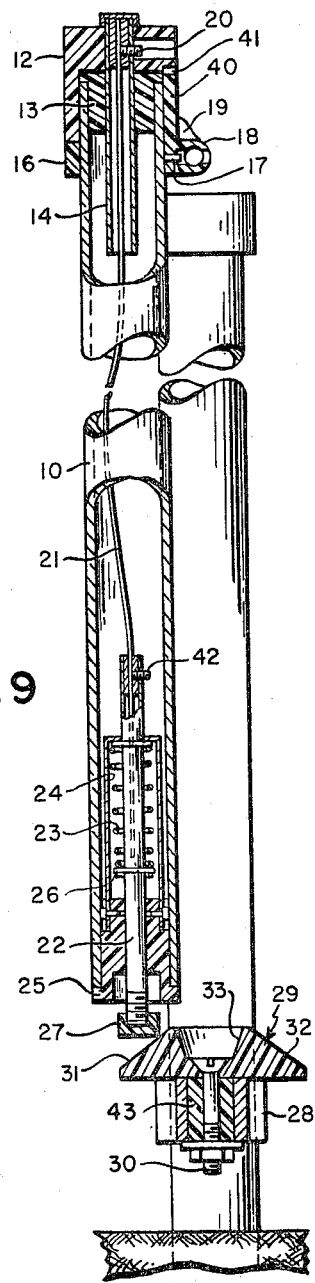

United States Patent Office 3,282,617
Patented Nov. 1, 1966

3,282,617
LOCKING MEANS FOR GATES
Robert G. Wason, West Hollywood, Fla., assignor to Invisibloc Corporation, Fort Lauderdale, Fla., a corporation of Florida
Filed July 28, 1964, Ser. No. 385,687
3 Claims. (Cl. 292—171)

This invention relates to locking devices for gates and has for one of its objects the provision of a locking device of this character which will have its operating elements confined within a vertical post on the gate so that no parts extending laterally from the post will be present; which will present the means for opening the gate at the extreme top of the gate so that the same will be maintained out of the reach of small children, and which will have numerous other advantages apparent to those skilled in this art.

More particularly, the invention contemplates the provision of a gate having a vertical post containing an axially-slidable, spring-biased locking bolt having a lower end protruding out of the bottom of the post; of a cap fitted on the upper end of the post and being non-rotative thereon but capable of being manually lifted axially of the post, the cap being connected to the bolt by a flexible cable extending downwardly through the interior of the post, whereby a manual lifting movement imposed on the cap will, by means of the cable, raise the bolt to free it from engagement with a recess provided in a striker plate supported by a fence post below the bolt. The striker plate includes inclined cam surfaces effective to guide the bolt into the recess when the gate is swung from an open to a closed position.

With these and other objects to be hereinafter set forth in view, I have devised the arrangement of parts to be described and more particularly pointed out in the claims appended hereto.

In the accompanying drawings, wherein an illustrative embodiment of the invention is disclosed:

FIG. 7 shows the gate in the act of being returned to locked position;

FIG. 8 is a sectional view taken substantially on the line 8—8 of FIG. 5, looking in the direction of the arrows, and FIG. 9 is an exploded view showing a portion of the gate and the locking elements therefor.

Figure 1:
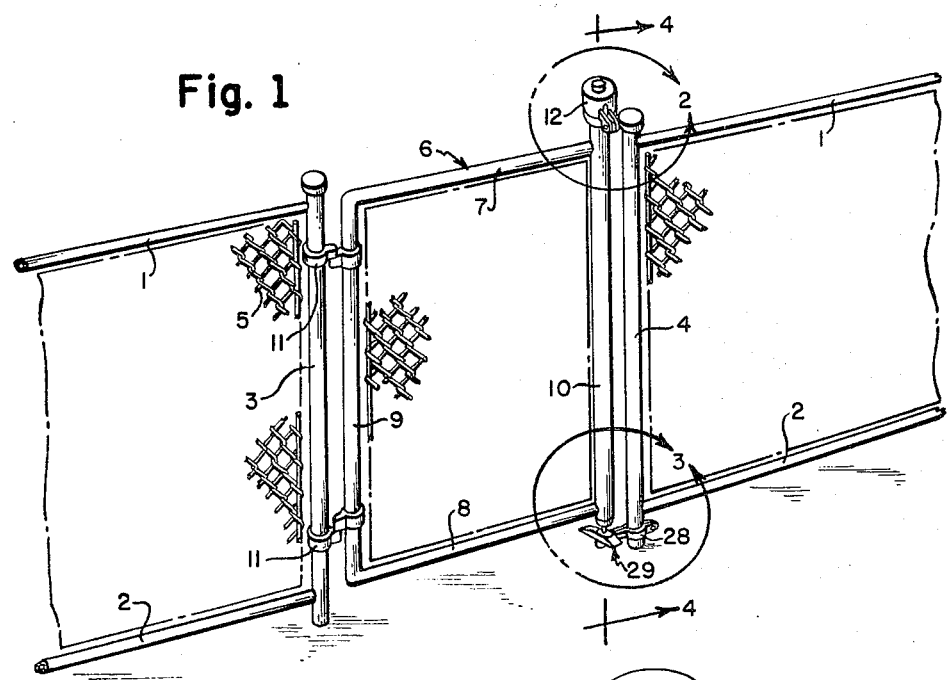
FIG. 1 is a perspective view of a fence gate provided with the improved locking means.
Figure 3:
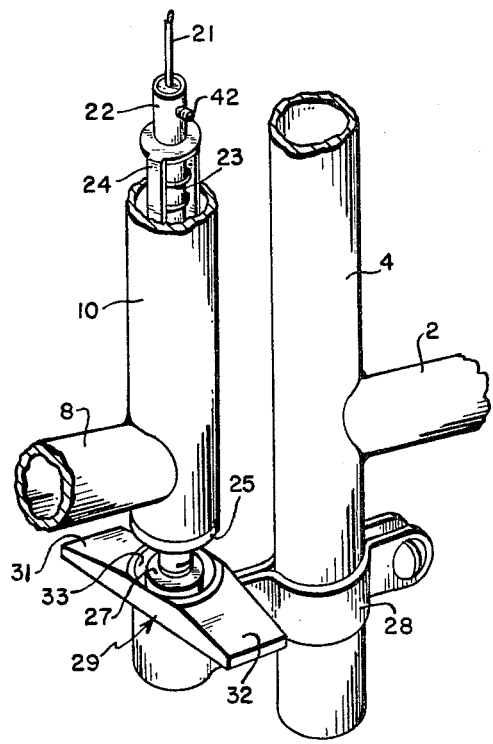
FIG. 3 is a perspective view of the portion of the gate that is contained within the circle designated at 3.
Figure 2:
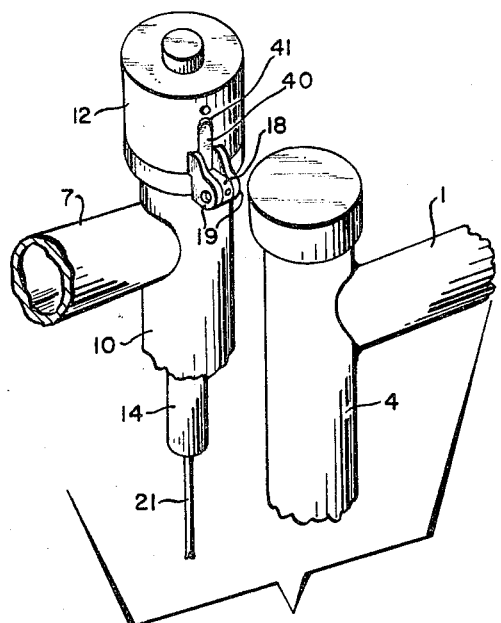
FIG. 2 is an enlarged perspective view of the portion of the gate that is contained within the circle designated at 2.

The gate to which the improved locking means is applied may be any one of a number of conventional types and in the form shown it includes top and bottom tubular rails indicated respectively at 1 and 2, connected by vertical posts spaced at intervals, the vertical end posts being shown respectively at 3 and 4, such end posts defining the gate opening between them. The fencing material stretched between the rails and posts may be wire mesh 5 or other suitable material.

The gate indicated generally at 6, is of rectangular form and consists of a frame composed of tubular material and having a top rail 7 and a bottom rail 8, these rails being connected by vertically-disposed tubular posts.

The post indicated at 9 is hingedly connected to the vertical fence post 3 by a strip hinges 11 or other suitable means for establishing a pivotal connection between the fence post 3 and the gate.

Figure 5:
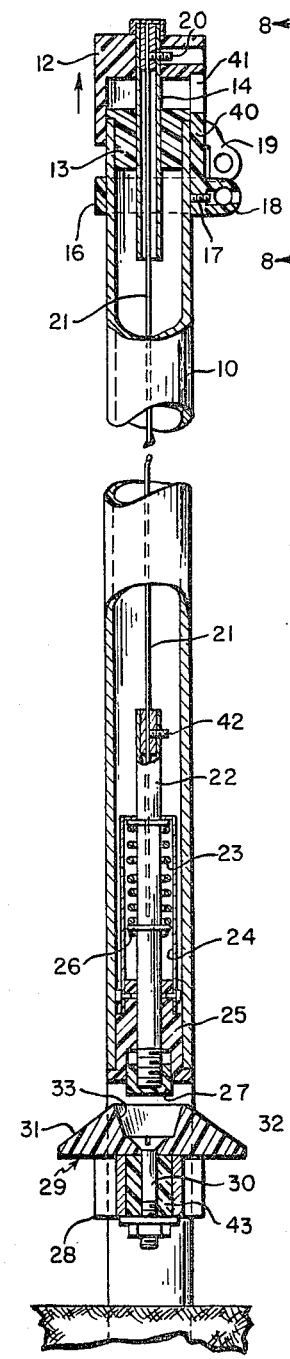
FIG. 5 is a sectional view similar to FIG. 4, but showing the locking device in open position.

The gate post 10 carries the latching means for the gate, and such means includes a cap 12 which telescopically fits on the upper end of the gate post 10 and is adapted to be manually raised as shown in FIG. 5 to unlatch the gate in a manner to be described.

The upper end of the gate post 10 is closed by a tubular plug 13, and a tube 14 is attached to the cap 12 and is slidably and vertically guided through a central passage through the plug. Secured around the gate post 10 near its upper end is a collar 16, which is fastened in place on the post 10 by a set screw 17 and said collar is provided with a projecting clevis 18 into which a lug 19 provided on the cap 12, extends when the cap is in its lowered or seated position and the device is locking the gate against swinging movement. To prevent opening of the gate, a padlock may be extended through the clevis 18 and the lug 19 to thereby restrain the cap 12 against raising movement. The collar 16 includes an upstanding part 40 clearly shown in FIG. 10 and which enters a complementary recess 41 in the cap 12. The interengagement of the parts 40 and 41 permit the axial raising movement of the cap while preventing its rotative movement relative to the post 10.

Fastened in the upper end of the tube 14 by a set screw 20 is a flexible wire cable 21 which is guided downwardly through the tube 14 to extend down through the post 10. The cable 21 is attached near its lower end by a set screw 42 to the upper end of a latch bolt 22. Said latch bolt is spring-biased in a downward direction by means of a coil spring 23 contained within a frame or sleeve 24 constituting an upward extension of a plug 25 fitted in the lower end of the gate post 10.

The bolt-biasing spring 23 is confined between the upper end of the sleeve 24 and a collar 26 provided on the bolt. The lower end of the bolt is provided with a protective cap 27 which can be threadably or otherwise secured on the end of the bolt.

Secured on the fence post 4 is a clamp 28 which supports a striker plate 29 secured in a bushing 43 held by the clamp, by means of the bolt 30. The striker plate 29 is formed with inclined upper cam faces 31 and 32 with a bolt-receiving recess located between them.

Figure 4:
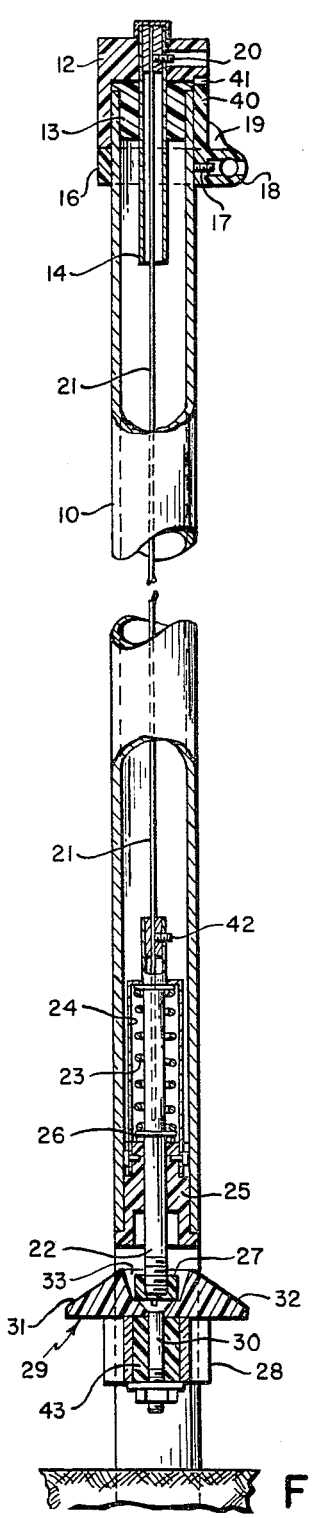
FIG. 4 is a sectional view, taken substantially on the line 4—4 of FIG. 1, looking in the direction of the arrows.
Figure 6:
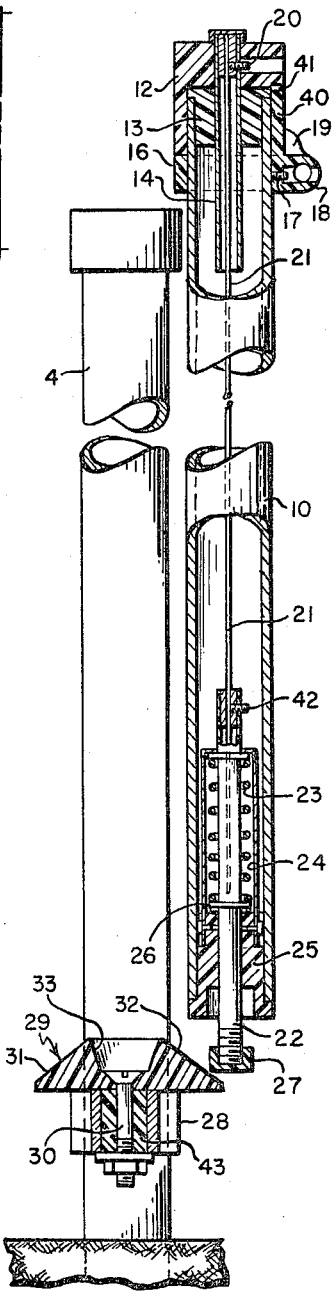
FIG. 6 is a similar view showing the gate open.

From the foregoing, the operation of the improved gate-locking means will be readily understood. In FIG. 4 the locking means is shown in its locked position in which the bolt 22 has its lower capped end entering the recess 33 in the striker plate so that the gate is held against opening movement or swing about its hinges 11. To open the gate a manual upward pull or lift is exerted on the cap 12 which will produce an upward pulling action force on the cable 21 causing the same to draw the bolt 22 upwardly in opposition to the bias of the spring 23, to thereby lift the lower end of the bolt out of the recess 33 and permit the gate to be swung to open position such as is shown in FIG. 6.

The closing of the gate does not require any manipulation of the locking means for when the gate is swung toward closed position, the capped lower end of the bolt will ride on either of the inclined cam surfaces 31 or 32 of the striker plate 29, depending upon which direction the gate is swung, and the bolt will then enter the recess 33 as shown in FIG. 4, to lock the gate against swinging movement. The flexibility of the cable 21 permits the elevating movement of the bolt 22 as the bolt rides up on one or the other of the inclined cam surfaces 31 or 32 to reach the recess 33 and be forced therein by the urge of the spring 23.

As will be apparent from the foregoing, the control of the opening movement of the bolt is had from the extreme top of the gate and by the manipulation of the cap 12 and this places the lock-controlling means above the reach of a small child. A substantial number of the parts of the locking device can be composed of a tough, non-corrosive plastic material thus insuring a long-lived useful device for effectively locking a gate. Most of the lock parts are housed within the gate post 10 and are thus protected from tampering and from the effects of the weather.

Having thus described a single embodiment of the invention, it is obvious that the same is not to be restricted thereto, but is broad enough to cover all structures coming within the scope of the annexed claims.

What I claim is:

1. A gate locking device comprising, a hinged gate having a vertical post at one end, a spring-biased bolt housed within the post and having its lower end projecting below the same, a striker plate mounted below the gate and having a recess for the reception of the lower end of the bolt, a cap fitted on the upper end of the post and movable axially in respect to the post, a flexible element having one end attached to the cap and its other end attached to the bolt, said flexible element extending through the interior of the post and causing an upward movement of the bolt against the bias of the spring when a manual lifting force is exerted on the cap, whereby the lower end of the bolt will be withdrawn from the recess in the striker plate, the upper end of the post being closed by a plug, a tube attached to the cap and being slidably guided through the plug, the striker plate having inclined surfaces, with the bolt-receiving recess located between such surfaces, the cap being recessed to receive the top of the post, and said bolt being provided with stop means so that said cap remains on said post when lifted to withdraw said lower end of said bolt from the recess in said striker plate.

2. A gate locking device comprising, a hinged gate having a hollow vertical post at one end, a spring-biased bolt housed within the post and having a lower end normally projecting from the bottom of the post under the force of the spring bias, a recessed striker plate below the post for the reception of the lower end of the bolt, a plug fitted within the post at its upper end, said plug having a central aperture, a cap fitted over the upper end of the post and over the top of the plug, said cap being non-rotative but axially slidable to a limited extent on the post, the cap having a stiff centrally-positioned tube extending downwardly from it, said tube being slidably guided through the central aperture in the plug, and a flexible cable having one end fixed within the tube, said cable extending downwardly through the interior of the post and having its lower end attached to the bolt.

3. A gate locking device according to claim 2, wherein a collar is fitted around the post adjacent to its upper end, the collar and the cap having interfitting parts which prevent rotative movement of the cap but permit its raising and lowering movement relatively to the post.

References Cited by the Examiner

UNITED STATES PATENTS

| 2,101,348 | 12/1937 | Schellinger | 292—171 |
| 2,482,341 | 9/1949 | Holmsten | 292—148 |
| 2,572,730 | 10/1951 | Jones et al. | 292—171 |
| 2,707,125 | 4/1955 | Ritter | 292—148 X |
| 3,174,314 | 3/1965 | Johnson | 292—148 X |

FOREIGN PATENTS

| 541,969 | 1/1932 | Germany. |
| 591,887 | 6/1947 | Great Britain. |
| 673,911 | 6/1952 | Great Britain. |

EDWARD C. ALLEN, *Primary Examiner*.

J. R. MOSES, *Assistant Examiner*.